Patented Dec. 4, 1928.

1,693,801

UNITED STATES PATENT OFFICE.

ROGER ADAMS AND GLEN SEFTON HIERS, OF URBANA, ILLINOIS, ASSIGNORS TO ABBOTT LABORATORIES, OF NORTH CHICAGO, ILLINOIS, A CORPORATION OF ILLINOIS.

CYCLOHEXYL-SUBSTITUTED ALIPHATIC ACIDS.

No Drawing.   Application filed July 24, 1926. Serial No. 124,775.

The invention relates to certain aliphatic acids and their derivatives in which the Omega carbon atom is substituted by a cyclohexyl group. The acids and their derivatives which have been prepared and which have been found to be useful as medicinals have the general formula

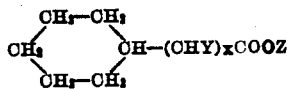

in which Y represents hydrogen, a halogen, or hydroxyl, X is three or more, and Z represents hydrogen, alkyl, or a metallic element.
These new compounds are especially effective against acid fast bacteria e. g. *B. leprae* or *B. tuberculoci.*

There are a variety of methods by which such acids may be prepared and merely one or two convenient procedures are described for certain members of this series. The acids containing from 2 to 8 carbons inclusive in the side chain can be made by the malonic ester synthesis from the proper bromide; the bromides in turn are prepared from the corresponding alcohols. Cyclohexyl bromide is converted into the Grignard derivative and treated either with formaldehyde to give cyclohexyl-carbinol or with ethylene oxide to give Beta-cyclohexyl-ethanol. These alcohols are then converted into their bromides and condensed with malonic ester to give the 3 and 4 carbon side chain acids. The Beta-cyclohexylethyl bromide is converted to the Grignard derivative and with formaldehyde or ethylene oxide yields Gamma-cyclohexyl-propanol or Delta-cyclohexyl-butanol respectively; by conversion to the bromides and condensation with malonic ester, the 5 and 6 side chain acids are obtained. By a similar procedure Delta-cyclohexyl-butyl bromide is converted to Epsilon-cyclohexyl-pentyl bromide and Zeta-cyclohexyl-hexyl bromide and these to the 7 and 8 carbon side chain acids.
The above reactions are illustrated by the following equations in which R represents cyclohexyl and $x$ represents one or more.

$RBr + Mg = RMgBr$

$RMgBr + HCHO = RCH_2OH$ $RMgBr + (CH_2)_2O = RCH_2CH_2OH$ $RCH_2CH_2OH \rightarrow RCH_2CH_2MgBr$ $RCH_2CH_2MgBr + HCHO =$
$\qquad RCH_2CH_2CH_2OH$

$RCH_2CH_2MgBr + (CH_2)_2O =$
$\qquad RCH_2CH_2CH_2CH_2OH.$ $R(CH_2)_xOH + PBr_3 = R(CH_2)_xBr$

$R(CH_2)_xBr + NaCH(COOC_2H_5)_2 =$
$\qquad R(CH_2)_xCH(COOC_2H_5)_2$ $R(CH_2)_xCH(COOC_2H_5)_2 =$
$\qquad R(CH_2)_xCH(COOH)_2 =$
$\qquad R(CH_2)_xCH_2COOH.$ The acids with side chains larger than 8 carbons are prepared by the condensation of the proper Grignard reagent with the aldehyde esters obtained by the ozonation of methyl oleate, methyl undecylenate or methyl erucate. The 9 carbon side chain acid is obtained from cyclohexyl bromide and methyl Nu-aldehydo-octanoate, the 10 carbon side chain acid from cyclohexyl bromide and methyl Theta-aldehydo-nonanoate, the 11 carbon side chain acid from Beta-cyclohexylethyl bromide and methyl Nu-aldehydo-octanoate, the 12 carbon side chain acid from Beta-cyclohexyl-ethyl-bromide and methyl Theta-aldehydo-nonanoate and finally the 13 carbon side chain acid from cyclohexyl bromide and methyl Lambda-aldehydo-dodecanoate. The hydroxy esters thus produced are converted to the oxygen free acids by conversion of the hydroxy esters into the bromides then to the unsaturated acids and finally to the saturated acids. The above reactions are illustrated by the following equations, in which R represents cyclohexyl, R' represents an alkyl group and $x$ represent six or more.

$RMgBr + OCH(CH_2)_xCOOR' =$
$\qquad RCHOH(CH_2)_xCOOR'$ $RCHOH(CH_2)_xCOOR' =$
$\qquad RCHBr(CH_2)_xCOOR'$ $RCHBr(CH_2)_xCOOR' =$
$\qquad RCH=CH(CH_2)_{x-1}COOR'$ $RCH=CH(CH_2)_{x-1}COOR' =$
$\qquad R(CH_2)_{x+1}COOR'$ One or two specific examples of the general procedures just described are given. This invention, however, is not limited to the methods of preparation since there may be other ways in which these same acids might be obtained.

*Cyclohexyl butyric acid.*—One mole of sodium malonic ester was prepared by adding one mole of malonic ester to an absolute alcohol solution of one mole of sodium ethylate. To this was added one mole of Beta-cyclohexyl-ethyl bromide and the mixture refluxed till neutral. Upon distilling the alcohol and adding water, the cyclohexyl ethyl malonic ester separated. This was purified by distillation under diminished pressure, b. p. 140° at 3 mm. One mole of cyclohexyl ethyl malonic ester was added slowly with stirring to a hot 50% potassium hydroxide solution and heated for 8 hours on a steam bath to distil out all of the alcohol produced by saponification. The mixture was then neutralized with hydrochloric acid to Congo red, keeping the temperature below 20°. The malonic acid was extracted with ether and purified from benzene, white crystals m. p. 129–130°. The malonic acid was heated to 140–160° for 2 to 3 hours and the resulting acid Gamma-cyclohexyl butyric acid obtained, b. p. 133.5–134.5° at 3 mm. (m. p. 29–30°). By a similar procedure using Gamma-cyclohexyl propyl bromide (b. p. 77–79° at 4 mm.), Delta-cyclohexyl butyl bromide (b. p. 91–92° at 4 mm.), Epsilon-cyclohexyl pentyl bromide (b. p. 113–114° at 5 mm.), Zeta-cyclohexyl hexyl bromide (b. p. 124–125° at 4 mm.) the acids with 5 to 8 carbons in the side chain were prepared. The reactions for the preparation of the above product are as follows, where R represents cyclohexyl.

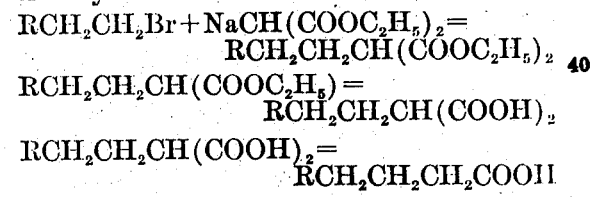

*Examples.*

Delta-cyclohexyl pentanoic acid (b. p. 151–153° at 5 mm.; m. p. 6–8°)
Epsilon-cyclohexyl hexanoic acid (b. p. 157–158° at 4 mm.; m. p. 33–34°)
Zeta-cyclohexyl heptanoic acid (b. p. 171–172° at 4 mm.; m. p. 25–26°)
Theta-cyclohexyl octanoic acid (b. p. 182–183° at 4 mm.; m. p. 37–38°)

A specific example of the other general procedure follows:

*Cyclohexyl-nonanoic acid.*—One half molecular equivalent of cyclohexyl magnesium bromide in dry ether was added slowly with stirring to 80 g. of methyl Nu-aldehydo octanoate (J.A.C.S. 48, 1074 (1926)) in dry ether keeping the temperature at −5°. After decomposition of the product in the usual way using ammonium chloride and water, the ether solution was washed with a little dilute hydrochloric acid, dried and distilled. There was then obtained methyl-Theta-cyclohexyl Theta-hydroxy nonanoate which boiled at 186–192° at 5 mm. This ester upon treatment with alcoholic potash, evaporation to dryness and acidification, gave the corresponding hydroxy acid, m. p. 78–79°.

The ester was converted to the hydroxy-free acid in the following way. To one mole of hydroxy ester was added with stirring 0.5 moles of redistilled phosphorus tribromide. The mixture was allowed to stand one-half hour at room temperature then one-half hour on a steam cone and finally decomposed with water, washed with 10% sodium carbonate solution and extracted with ether. After drying the ether and removing the solvent by distillation, the crude bromide was obtained and converted into the unsaturated acid by refluxing for 4 hours with a solution of several moles of potassium hydroxide in 95% alcohol. After dilution and evaporation of most of the alcohol, the solution was acidified and the unsaturated acid extracted with ether. Upon evaporation of ether, the unsaturated acid was dissolved in 95% alcohol and reduced with hydrogen at 2–3 atmospheres pressure in the presence of platinum oxide platinum black as a catalyst. The calculated amount of hydrogen was absorbed rapidly. The catalyst was filtered, the alcohol diluted and the saturated acid crystallized. It was readily purified from various organic solvents. It melted at 45.5–46.5°. The reactions described above are as follows, where R represents cyclohexyl.

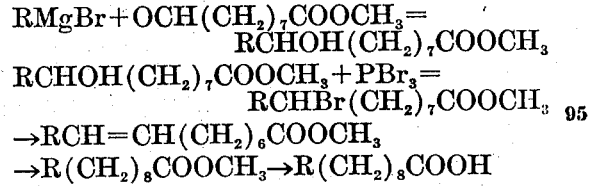

By a similar procedure the following hydroxy esters, acids, and saturated acids were produced.

INTERMEDIATES.

*Alpha-hydroxy esters.*

$C_6H_{11}CHOH(CH_2)_8COOCH_3$ ---- 191–195° at 4 mm.
$C_6H_{11}CH_2CH_2CHOH(CH_2)_8COOCH_3$ ---- 214–218° at 4 mm.
$C_6H_{11}CH_2CH_2CHOH(CH_2)_7COOCH_3$ ---- 192–198° at 4 mm.
$C_6H_{11}CHOH(CH_2)_{11}COOCH_3$ ---- 212–217° at 4 mm.

Beta-hydroxy acids.

| | M. P. Degrees. |
|---|---|
| $C_6H_{11}CHOH(CH_2)_8CO_2H$ | 63–64 |
| $C_6H_{11}(CH_2)_2CHOH(CH_2)_7CO_2H$ | 75–76 |
| $C_6H_{11}(CH_2)_2CHOH(CH_2)_8CO_2H$ | 58–59 |
| $C_6H_{11}CHOH(CH_2)_{11}-CO_2H$ | 72–73 |

Final products (acids).

| | M. P. Degrees. |
|---|---|
| $C_6H_{11}(CH_2)_9CO_2H$ | 52.5–53.5 |
| $C_6H_{11}(CH_2)_{10}CO_2H$ | 58 –59 |
| $C_6H_{11}(CH_2)_{11}CO_2H$ | 61.5–62 |
| $C_6H_{11}(CH_2)_{12}CO_2H$ | 63 –64 |

The described details of materials and process used being merely illustrative of preferred applications of our invention, it will be understood that the scope of the same must be determined by reference to the appended claims, said claims being construed as broadly as possible, consistent with the state of the art.

We claim as our invention:

1. New compounds of the formula

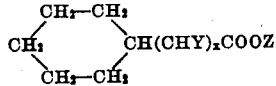

in which Y represents hydrogen, a halogen, or hydroxyl, $x$ represents 3 or more, and Z represents hydrogen, alkyl or a metallic element.

2. New compounds of the formula

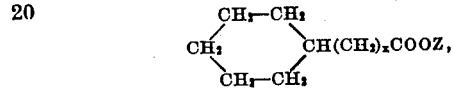

in which $x$ represents 3 or more, and Z represents hydrogen, alkyl or a metallic element.

3. New compounds of the formula

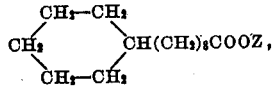

in which Z represents hydrogen, alkyl or a metallic element.

4. The new compound cyclohexyl nonanoic acid, having the formula

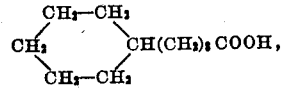

which is a white solid melting at 45.5°–46.5° C., and which yields water-soluble salts upon treatment with the necessary metal hydroxide.

ROGER ADAMS.
GLEN SEFTON HIERS.